United States Patent
Bunting et al.

(10) Patent No.: US 12,497,953 B2
(45) Date of Patent: Dec. 16, 2025

(54) ACTUATOR ASSEMBLY

(71) Applicant: CAMBRIDGE MECHATRONICS LIMITED, Cambridge (GB)

(72) Inventors: Stephen Matthew Bunting, Cambridge (GB); Daniel John Burbridge, Cambridge (GB); Joshua Carr, Cambridge (GB); James Howarth, Cambridge (GB); Robert Langhorne, Cambridge (GB); Jason Tun, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/728,826

(22) PCT Filed: Jan. 13, 2023

(86) PCT No.: PCT/GB2023/050068
§ 371 (c)(1),
(2) Date: Jul. 12, 2024

(87) PCT Pub. No.: WO2023/135432
PCT Pub. Date: Jul. 20, 2023

(65) Prior Publication Data
US 2025/0059959 A1    Feb. 20, 2025

(30) Foreign Application Priority Data
Jan. 13, 2022    (GB) ..................... 2200377

(51) Int. Cl.
*F03G 7/06* (2006.01)
*G02B 7/09* (2021.01)
(Continued)

(52) U.S. Cl.
CPC ....... *F03G 7/06143* (2021.08); *F03G 7/0665* (2021.08); *G02B 7/09* (2013.01);
(Continued)

(58) Field of Classification Search
CPC ..... F03G 7/06143; F03G 7/0665; G02B 7/09; G03B 5/00; G03B 13/34; G03B 2205/0023; G03B 2205/0046
See application file for complete search history.

(56) References Cited

U.S. PATENT DOCUMENTS

2010/0236236 A1* 9/2010 Mankame ............... F03G 7/062
                                                         60/527
2018/0149142 A1* 5/2018 Bunting .................. G02B 7/08
(Continued)

FOREIGN PATENT DOCUMENTS

| CN | 108223320 A | 6/2018 |
| WO | 2021171030 A1 | 9/2021 |
| WO | 2022084699 A1 | 4/2022 |

OTHER PUBLICATIONS

International Search Report and Written Opinion of PCT/GB2023/050068 dated May 16, 2023.

*Primary Examiner* — Shafiq Mian
(74) *Attorney, Agent, or Firm* — Van Hoven PC; Stefan D. Osterbur; Joshua Van Hoven

(57) ABSTRACT

An actuator assembly (100) comprises: a support structure (51); a movable part (10) that is movable relative to the support structure; and a set of one or more actuating units (80). Each actuating unit (80) is configured, on actuation, to apply a force on the movable part (10) that is substantially directed along a line in a plane perpendicular to a primary axis (z). Each actuating unit (10) comprises: a force-modifying mechanism (84) connected to one of the support structure (51) and the movable part (10); a coupling link (83) connected between the force-modifying mechanism (84) and the other of the support structure (51) and the movable part (10); and an SMA element (70a) connected between the force-modifying mechanism (84) and the one of the support structure (51) and the movable part (10). The SMA element (70a) is configured to exert an input force on the force-modifying mechanism (84), thereby causing the force-modifying mechanism (84) to apply an output force on the coupling link (83) and causing the coupling link (83) to apply an actuating force on the other of the support structure (51) and the movable part (10). The component of the input force along the primary axis (z) has a greater magnitude than the component of the input force in any direction perpendicular to the primary axis (z).

19 Claims, 6 Drawing Sheets

(51) Int. Cl.
  *G03B 5/00* (2021.01)
  *G03B 13/34* (2021.01)
(52) U.S. Cl.
  CPC ............... *G03B 5/00* (2013.01); *G03B 13/34* (2013.01); *G03B 2205/0023* (2013.01); *G03B 2205/0046* (2013.01); *G03B 2205/0076* (2013.01)

(56) References Cited

U.S. PATENT DOCUMENTS

2018/0348593 A1* 12/2018 Brown .................... G03B 3/10
2019/0136839 A1*  5/2019 Miller ..................... G02B 7/08
2019/0155002 A1*  5/2019 Shabtay ............. G02B 13/0065

* cited by examiner

ACTUATOR ASSEMBLY

CROSS-REFERENCE TO RELATED APPLICATIONS

This application is a national stage application under 35 U.S.C. § 371 of International Application No. PCT/GB2023/050068, filed Jan. 13, 2023, which claims priority of GB Patent Application No. 2200377.6, filed Jan. 13, 2022, the disclosures of each of which are hereby incorporated by reference herein in their entireties.

FIELD

The present application relates to an actuator assembly, particularly one with shape memory alloy (SMA) elements.

BACKGROUND

Shape memory alloy (SMA) actuators are used in folded camera assemblies for effecting a range of motions of an optical assembly. Folded cameras may resemble a periscope and may be defined as cameras having one or more reflectors to provide a lengthened optical path. Advantageously, such an arrangement may provide a thinner camera assembly, as well as permitting a greater range of movement for the lenses. As an example, WO2018/158590 describes a folded camera having an SMA actuator configured to tilt a mirror or prism about one or more axes for effecting optical image stabilisation (OIS). More specifically, the SMA actuator described in WO2018/158590 comprises a gimbal, wherein contraction in plural lengths of SMA wire extending parallel to the gimbal causes titling motion the mirror or prism. In another example, WO 2020/074899 describes a folded camera with an SMA actuator assembly including a support structure, a moveable part that supports a lens assembly, plural lengths of SMA wire connected between the support structure and the moving part. The lengths of SMA wire extend substantially perpendicular to the optical axis and are configured to, on contraction, move the movable part to provide optical image stabilization (OIS).

SUMMARY

According to one aspect of the present invention, there is provided an actuator assembly as specified in claim 1.

Further features are specified in the dependent claims and/or below.

Typically, the movement range of moveable element are defined by the extent of contraction in the SMA wires. More specifically, the maximum displacement of the moveable element ("stroke") in any movement direction may be limited by the relatively small amount of contraction (about 2-3%) in the SMA wires. To increase the maximum stroke, longer lengths of SMA actuator wire are required. However, such solution may not be practical in prior art folded camera arrangements, since the depth and width of the folded cameras are limited in mobile devices.

The present techniques thus provide an SMA actuator assembly having SMA wire largely extending along an optical axis by accommodating an SMA wire along the length of the folded camera. Furthermore, one or more flexures are provided for transferring movement along the optical axis to a substantially perpendicular direction and/or amplifying the said movement. Advantageously, such an arrangement may allow a greater stroke to be achieved, thus improving the performance and capability in optical image stabilisation (OIS), autofocus (AF) and/or zoom achievable in the folded camera.

According to another aspect of the present invention, there is provided an apparatus comprising:
  an elongate body having a longitudinal axis;
  a part that is movable relative to the body; and
    a set of one or more actuating units for moving the part along the longitudinal axis and/or perpendicularly to the longitudinal axis, wherein each actuating unit comprises:
  a force-modifying mechanism connected to the body;
  a coupling link connected between the force-modifying mechanism and the part;
  an SMA wire connected between the force-modifying mechanism and the body, wherein the SMA wire is configured to, on contraction, exert an input force on the force-modifying mechanism, thereby causing the force-modifying mechanism to apply an output force on the coupling link and causing the coupling link to apply an actuating force on the part, wherein the component of the input force along the longitudinal axis has a greater magnitude than the component of the input force in any direction perpendicular to the longitudinal axis.

The apparatus may be a camera assembly or a mobile phone. The elongate body may be a body of the camera assembly or the mobile phone having an integrated SMA actuator assembly. Alternatively, the body may be a body of an SMA actuator assembly (or a module) that can be assembled into the camera assembly or the mobile phone. More specifically, the body may substantially contain the force-modifying mechanism, the coupling link and the SMA wire.

The part (or a moveable part) may comprise a lens (or a lens carriage having the lens) having an optical axis along the longitudinal axis. The lens may, in some embodiments, protrude outwardly from the body in the longitudinal axis. Alternatively, or in addition, the part may comprise an image sensor (or a platform supporting the image sensor facing in a direction along the longitudinal axis. The SMA actuator assembly provides one or more of: optical image stabilisation (OIS), autofocus (AF) and zoom for the camera assembly. Preferably, the camera assembly may be a folded camera assembly where the optical axis (or longitudinal axis of the body) extends along the greatest dimension of the body of the actuator assembly.

The SMA wire may be configured to, on contraction, exert an input force having at least a force component along the longitudinal axis. Optionally, in at least one of the actuating units, the SMA wire extends in a direction that is substantially parallel to the longitudinal axis. Thus, the input force may only consist of the force component along the longitudinal axis.

Alternatively, or in addition, in at least one of the actuating units, the SMA wire extends in a direction that is angled to the longitudinal axis. Thus, the input force may comprise an additional force component in a direction perpendicular to the longitudinal axis, wherein the component of the input force along the longitudinal axis has a greater magnitude than the component of the input force in any direction perpendicular to the longitudinal axis. In another words, the extent of contraction in the SMA wires is greatest along the longitudinal axis.

Broadly speaking, by utilising the length of a folded camera, the present invention may be configured such that lengthier SMA wires are provided in comparison to prior art cameras. Advantageously, by the force-modifying mechanism, the force resulting from the contraction in the lengthened SMA wires may be transferred to other directions for providing functionalities such as optical image stabilisation (OIS) and/or sensor shift.

Furthermore, the use of the force-modifying mechanism may, in some cases, result in amplification of the stroke. More specifically, the present invention may use the force-modifying mechanism as a lever to amplify the achievable displacement in the moveable part by a given extent of contraction in the SMA wire. Thus, in at least one of the actuating units, the displacement of the part is greater than the contraction of the SMA wire. Advantageously, the present embodiment may increase the stroke, and thereby improves the performance of OIS, autofocus (AF) and zoom in the camera assembly or the mobile phone.

The apparatus may comprise one or more (e.g. elongate) SMA wires, which may connect with the part by the force-modifying mechanism. That is, such an apparatus differs from known devices in that the SMA wire may not directly connect between the body and the part. Instead, one end of the SMA wire may be attached to the force-modifying mechanism, whereby the actuating force may be transferred to the part through the coupling link. Specifically, the coupling link is not an SMA wire.

The SMA wire may be configured to, on contraction, effect relative movement between the body and the part in directions along the longitudinal axis and/or perpendicularly to the longitudinal axis. The coupling link may be compliant in any direction in a movement plane. Thus, the coupling link can accommodate movement produced by other actuating units.

The coupling link may be formed separately from parts of the force-modifying mechanism, e.g. a movable portion of the force-modifying mechanism. In embodiments, the coupling link may be formed from the same or different material to the force-modifying mechanism. For example, the force-modifying mechanism may be rigid or at least have a higher stiffness than the coupling link. In embodiments, the coupling link may be attached to the parts of the force-modifying mechanism by any suitable attaching means, such as welding, adhesive and mechanical means. In some embodiments, the coupling link may be formed integrally with parts or entirety of the force-modifying mechanism. Advantageously, such an arrangement may result in a more efficient manufacturing process, as well as a lower production cost.

The coupling link may a flexure, wherein the flexure may be elongate and may be stiff along its length and compliant in a direction perpendicular to its length. That is, the coupling link may be referred to as a flexure arm which is configured to bend easily in the movement plane but may be stiff or non-compliant in other directions.

Additionally, the coupling link may be configured to apply a biasing force on the part, so as to return the part to and/or retain the part at a default (or central) position.

In some embodiments, the coupling link may be considered to be the component that is primarily responsible for transferring the actuating force to the part. The coupling link may be a preformed flexure arm that constrains rotational movement in the part around the longitudinal axis.

Alternatively, the coupling link may be a rigid member, such as a rod, with pin joints that allow the coupling link to pivot in the movement plane. Advantageously, such an arrangement may allow precise control of the displacement in the part. In some other embodiments, the pivot may be a post extending from the force-modifying mechanism or the part, and upon energising the SMA component, the force-modifying mechanism may be configured to roll on the surface of the post.

The force-modifying mechanism may be configured such that, in response to contraction in the SMA wire, the end of the SMA wire that is connected to the force-modifying mechanism moves relative to the part by a first distance, and the end of the coupling link that is connected to the force-modifying mechanism moves relative to the part by a second distance that is the same as the first distance, albeit in a different direction.

Alternatively, the force-modifying mechanism may be configured such that, in response to contraction in the SMA wire, the end of the SMA wire that is connected to the force-modifying mechanism moves relative to the part by a first distance, and the end of the coupling link that is connected to the force-modifying mechanism moves relative to the part by a second distance that is greater than the first distance.

Alternatively, the force-modifying mechanism is configured such that, in response to contraction in the SMA wire, the end of the SMA wire that is connected to the force-modifying mechanism moves relative to the part by a first distance, and the end of the coupling link that is connected to the force-modifying mechanism moves relative to the part by a second distance that is smaller than the first distance. For example, such an arrangement may be configured to increase the applicable actuating force with a given input force by the SMA wire.

The SMA wires may be configured to, on contraction, effect movement of the moveable part in at least one direction substantially perpendicular to an optical axis, e.g. along the moveable plane. Such an arrangement may enable at least optical image stabilisation (OIS) to be performed upon actuating the or each of the SMA components. For example, the SMA wires may extend in a direction substantially along the longitudinal axis, or it may incline at an acute angle less than 45°, or less than 30°, or less than 15°, or less than 5° from the longitudinal axis, or parallel to the longitudinal axis, or it may extend helically around the longitudinal axis, e.g. a helical axis. Preferably, the SMA components may each be provided on a respective side of the body along the longitudinal axis.

Alternatively, or in addition, the SMA wires may be configured to, on contraction, effect movement of the moveable part in at least one direction parallel to an optical axis. That is, the movement in the moveable part and the contraction of SMA wire may be in substantially the same direction as, or in a direction opposite, to the contraction of SMA wire. Such an arrangement may enable at least autofocus (AF) and/or zoom to be performed upon actuating the or each of the SMA wires. For example, the SMA wires may extend in a direction substantially along the longitudinal axis, or along a helical axis aligned with the longitudinal axis. In some embodiments, the SMA wires may be each provided on a respective side, or towards the central longitudinal axis of the body.

The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The SMA wires may form from any suitable shape memory alloy material, typically a nickel-titanium alloy (e.g. Nitinol), but they may also contain tertiary components such as copper. The SMA wires may have any cross-sectional profile and diameter suitable for the application. For example, the SMA wires may be SMA wires each having a cross section diameter of 25 µm, or 30 µm, or 35 µm, capable of generating a maximum force of between 120 mN to 400 mN whilst maintaining the strain in the SMA wire within safe limits (e.g. 2-3% reduction in length over original length). Increasing the diameter of each SMA wire from 25 µm to 35 µm approximately doubles the cross-sectional area of the SMA wire and thus approximately doubles the force provided by each SMA wire.

Optionally, in at least one of the actuating units, the force-modifying mechanism comprises:
  a movable portion to which the SMA wire and the coupling link are connected; and
  a force-modifying flexure connected between the movable portion and the body and configured to bend in response to the input force.

The movable portion may be rigid or flexible. The movable portion may be more rigid than the force-modifying flexure in the movement plane such that the movable portion resists deformation as the SMA component contracts. The movable portion may be an extension of the coupling link and/or of the force-modifying flexure.

The force-modifying flexure may be configured to bend such that the part moves in directions in the movement plane.

The force-modifying flexure may have a lower stiffness in a direction along a movement plane than any other directions to facilitate the rotation and/or translation of the movable portion. For example, the force-modifying flexure may be formed of a thin strip that is flexible only along the movement plane.

The movable portion may be formed separately to the force-modifying flexure. In embodiments, the movable portion may be formed from the same or different material to the force-modifying flexure and the coupling link. For example, the movable portion may be rigid or at least having a higher stiffness than the force-modifying mechanism and or the coupling link, so as to prevent deformation during actuation of the SMA wires. In embodiments where the movable portion and force-modifying flexure are separately formed, the movable portion may be attached to the force-modifying flexure by any suitable attaching means, such as welding, by adhesive and mechanical means. Preferably, the movable portion may be formed integrally with the force-modifying flexure. Advantageously, such an arrangement may result in a more efficient manufacturing processing, as well as a lower production cost.

Optionally, the force-modifying flexure is configured to have the same or different stiffness in a direction along its length. Such an arrangement may advantageously allow the characteristics of the deformation in the force-modifying flexure to be tuned, so as to achieve a desirable rotation/translation in the movable portion.

Optionally, in the at least one actuating unit, the force-modifying flexure is generally in tension when the SMA wire is in tension.

Optionally, in the at least one actuating unit:
  the force-modifying flexure is connected to the body at one end thereof; and/or
  the SMA wire is connected to the body at the other end thereof.

Optionally, the apparatus comprises a set of one or more first actuating units for moving the part perpendicularly to the longitudinal axis. That is, the first actuating units may be responsible for providing OIS functions.

Optionally, in at least one of the first actuating units, the force-modifying flexure extends at a non-zero acute angle to a plane perpendicular to the longitudinal axis, optionally wherein the angle is between 30° and 60°, optionally wherein the angle is substantially 45°. The orientation of the force-modifying flexure with respect to the plane corresponds to a degree of amplification in displacement of the part. At angles smaller than 45°, the movable part may move with an amplified displacement, however it may also reduce the output force for moving the movable part. At angles larger than 45°, the movable part may move with de-amplified displacement, however it may give rise to higher output force for moving the movable part. At a 45° angle, there may be no amplification nor de-amplification in the movement of the movable part.

Optionally, in at least one of the first actuating units, the coupling link is elongate and extends in a direction that is at least partly perpendicular to the longitudinal axis. In some embodiments, the coupling link extends in a direction that is substantially perpendicular to the longitudinal axis. Such an arrangement may ensure the entire actuating force is applied perpendicularly to the longitudinal axis.

Optionally, in at least one of the first actuating units, the input and output forces act at first and second points, respectively, of the movable portion of the force-modifying mechanism, wherein the first and second points are first and second distances, respectively, from a rotation centre of the movable portion of the force-modifying mechanism, wherein the second distance is greater than the first distance. Such an arrangement may amplify the displacement of the movable part. In some other embodiments, the second distance may be shorter than the first distance, thus de-amplifies the displacement of the movable part. In some other embodiments, the second distance is equal to the first distance, wherein the movement of the moveable part is neither amplified nor de-amplified.

Optionally, the actuator comprises four first actuating units spaced around the longitudinal axis and configured so as to be capable of moving the part in any direction in a movement plane perpendicular to the longitudinal axis without applying any net torque to the part about the longitudinal axis. In some embodiments where the elongate body is in the form of a cuboid, the four first actuating units may each be position at a respective corner of the cuboid, or at a mid-point of a respective edge.

Optionally, the part is connected to the body via a helical bearing configured to guide helical movement of the part around a helical axis that is substantially parallel to the longitudinal axis; and the apparatus comprises a set of one or more second actuating units for driving the helical movement.

Optionally, in at least one of the second actuating units, the coupling link comprises:
- a first portion connected to the movable portion of the force-modifying mechanism, wherein the first portion is elongate and extends in a direction that is at least partly parallel to the longitudinal axis and wherein, on contraction of the SMA wire, the first portion rotates about an axis that is at least partly perpendicular to the longitudinal axis; and
- a second portion connected via a first connection point to the first portion and connected via a second connection point to the part, wherein the second portion is deformable to enable the relative position of the first and second connection points to change so that, on contraction of the SMA wire, the second connection point moves along a helical path around the helical axis.

More specifically, the second actuating units are responsible for driving movement along the longitudinal axis.

Optionally, the second portion of the coupling link comprises a leaf spring. In other embodiments, the second portion of the coupling link may alternatively comprise other suitable resilient elements.

Optionally, in at least one of the second actuating units, the force-modifying flexure extends in a direction that is substantially parallel to the longitudinal axis.

Optionally, in at least one of the second actuating units, the force-modifying flexure and SMA wire are connected to the movable portion of the force-modifying mechanism at first and second connection points, respectively, wherein the second connection point is offset from the first connection point in a first direction when viewed along the longitudinal axis.

Optionally, the at least one second actuating unit comprises:
- a further SMA wire connected to the movable portion of the force-modifying flexure at a third connection point that is offset from the first connection point in a second direction that is substantially opposite to the first direction when viewed along the longitudinal axis, such that, on contraction of the SMA wire, the first portion of the coupling link rotates in a first sense and, on contraction of the further SMA wire, the first portion of the coupling link rotates in a second, opposite sense.

Optionally, the actuator unit comprises two second actuating units that are diametrically opposed in relation to the longitudinal axis. For example, one of the second actuating units is responsible for effecting AF may be configured to have less stroke amplification than the other second actuating unit that is responsible for effecting zoom, thus providing a finer, more accurate, step change when carrying out AF.

Optionally, the part comprises:
- a first subpart to which the one or more first actuating units are connected, wherein the first subpart is connected to the body via a bearing that restricts rotation of the first subpart relative to the body about any line parallel to the longitudinal axis; and
- a second subpart to which the one or more first actuating units are connected, wherein the second subpart is connected to the first subpart via the helical bearing;

such that the one or more first actuating units are for moving the first and second subparts perpendicularly to the longitudinal axis, and the one or more second actuating units are for driving the helical movement of the second subpart relative to the first subpart.

Optionally, the apparatus comprises:
- a second part that is connected to the body via a second helical bearing configured to guide helical movement of the second part around a helical axis that is substantially parallel to the longitudinal axis; and
- a set of one or more third actuating units for driving the helical movement of the second part; wherein each third actuating unit comprises:
- a force-modifying mechanism connected to the body;
- a coupling link connected between the force-modifying mechanism and the second part;
- an SMA wire connected between the force-modifying mechanism and the body, wherein the SMA wire is configured to, on contraction, exert an input force on the force-modifying mechanism, thereby causing the force-modifying mechanism to apply an output force on the coupling link and causing the coupling link to apply an actuating force on the part, wherein the component of the input force along the longitudinal axis has a greater magnitude than the component of the input force in any direction perpendicular to the longitudinal axis;
- wherein the force-modifying flexure of the one or more third actuating units and/or the SMA wire of the one or more second actuating units are connected to the body at one end thereof, and the SMA wire of the one or more third actuating units and/or the force-modifying flexure of the one or more second actuating units are connected to the body at the other end thereof.

Optionally, the at least one actuating unit, the movable portion of the force-modifying mechanism is integrally formed with the force-modifying flexure and/or at least a part of the coupling link.

Optionally, the at least one actuating unit, the movable portion has a higher rigidity than the force-modifying flexure.

Optionally, at least one of the actuating units further comprises a resilient element configured to oppose the actuating force.

Optionally, the movable part comprises at least one lens having an optical axis that is parallel to, or collinear with, the longitudinal axis, wherein the one or more actuating units are for moving the at least one lens to provide optical image stabilisation, autofocus and/or zoom.

Optionally, the movable part comprises an image sensor having a normal that is parallel to the longitudinal axis, wherein the one or more of the actuating units are for moving the image sensor to provide optical image stabilisation and/or super-resolution.

Optionally, the camera assembly corresponds to a folded camera.

According to another aspect of the invention, there is provided an actuator assembly comprising: structure; a movable part that movable relative to the support structure; at least one first SMA element arranged, on actuation, to apply a force on the moveable part relative to the support structure along a first axis; and at least one actuating unit arranged, on actuation, to apply a force on the movable part with a component along a second axis, wherein the first axis and the second axis are orthogonal to each other, and wherein each actuating unit comprises: a force-modifying mechanism connected to one of the support structure and the movable part; a coupling link connected between the force-modifying mechanism and the other of the support structure and the movable part; a second SMA element arranged, on actuation, to exert an input force on the force-modifying mechanism with a component along the first axis, thereby causing the force-modifying mechanism to apply an output force on the coupling link and causing the coupling link to apply an actuating force on the other of the support structure and the movable part with a component along the second axis.

So, the first and second SMA elements both apply actuating forces with a component along a first axis and so may be substantially parallel to each other. This may allow the footprint actuator assembly to be made more compact along the second axis compared to a situation in which the SMA elements apply perpendicular forces and so are perpendicular to each other. Manufacturing of the actuator assembly may also be made simpler by avoiding perpendicular SMA elements. At the same time, the use of the force-modifying mechanism to redirect the actuating force of the second SMA elements allows forces to be applied on the movable part to effect movement in two degrees of freedom.

Further aspects of the present invention are set out in the dependent claims.

BRIEF DESCRIPTION OF THE DRAWINGS

Certain embodiments of the present invention will now be described, by way of example only, with reference to the accompanying drawings, in which.

DETAILED DESCRIPTION

Camera Assembly

Figure 1:
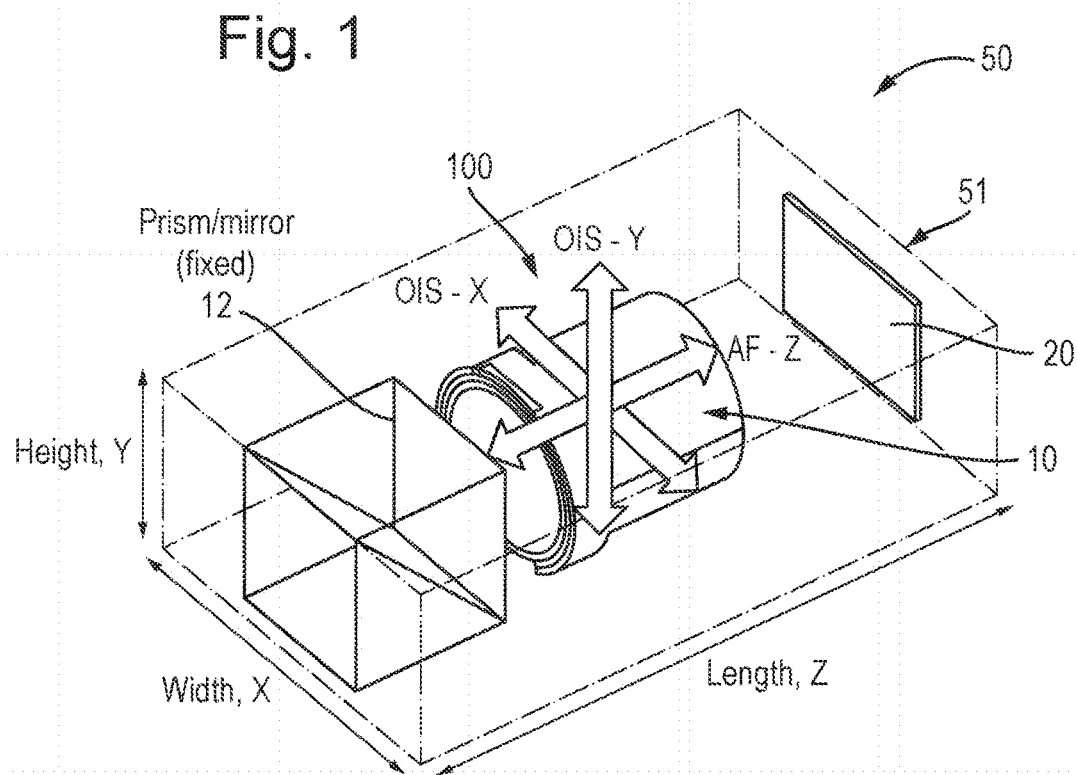
FIG. 1 is a perspective view of a folded camera assembly according to a first embodiment of the present invention.

FIG. 1 is a perspective view of a camera assembly 50 with an SMA actuator assembly 100 (shown schematically in the figure). The camera assembly 50 includes a lens assembly 10, a prism/mirror 12 and an image sensor 20. The camera assembly 50 includes an elongate housing 51 within which the other components 10, 12, 20, 100 are fully or partially contained. In this example, the housing 51 is cuboid. The housing 51 has a longitudinal axis, which corresponds to the z-axis in this instance. The housing 51 is also referred to as the body. The prism/mirror 12 is located towards one end of the housing 51, and the image sensor 20 is located towards another end of the housing. The image sensor 20 is mounted on an endwall of the housing 51. The lens assembly 10 is arranged such that the optical axis of the lenses therein generally lies along the longitudinal axis z. In operation, light enters the housing 51 in a direction that is perpendicular to the longitudinal axis z, i.e. parallel to the y-axis in the figure, before being "folded" to travel along the longitudinal axis z to the image sensor 20. The lens assembly 10 is arranged to focus an image onto the image sensor 20.

Such a folded optics arrangement is particularly useful in portable electronic devices where the thickness of the device in the direction of initial light entry (e.g. the y-direction) is constrained. For example, smartphones are becoming thinner, such that it becomes more difficult to mount all elements of a camera device along a single optical axis in the thickness direction of the device.

The lenses of the lens assembly 10 may have diameters of up to about 30 mm. The camera assembly can thus be referred to as a miniature camera. The image sensor 20 captures the image and may be of any suitable type, for example, a charge-coupled device (CCD) or a complementary metal-oxide semiconductor (CMOS) device. The camera assembly 50 further comprises an integrated circuit (not shown) in which a control circuit is implemented, and also a gyroscope sensor (not shown).

The SMA actuator assembly 100 supports the lens carriage 10 and provides for one or more directions of movement (or degrees-of-freedom) of the lens assembly 10 relative to the housing 51. Movement of the lens assembly 10 in the x- and y-directions can provide for optical image stabilisation ("OIS"), whilst movement in the z-direction can provide for autofocus ("AF"). In certain arrangements, the lens assembly 10 may include lenses which are movable relative to each other, with such relative movement providing for zoom.

SMA Actuator Assembly

Figure 3A:
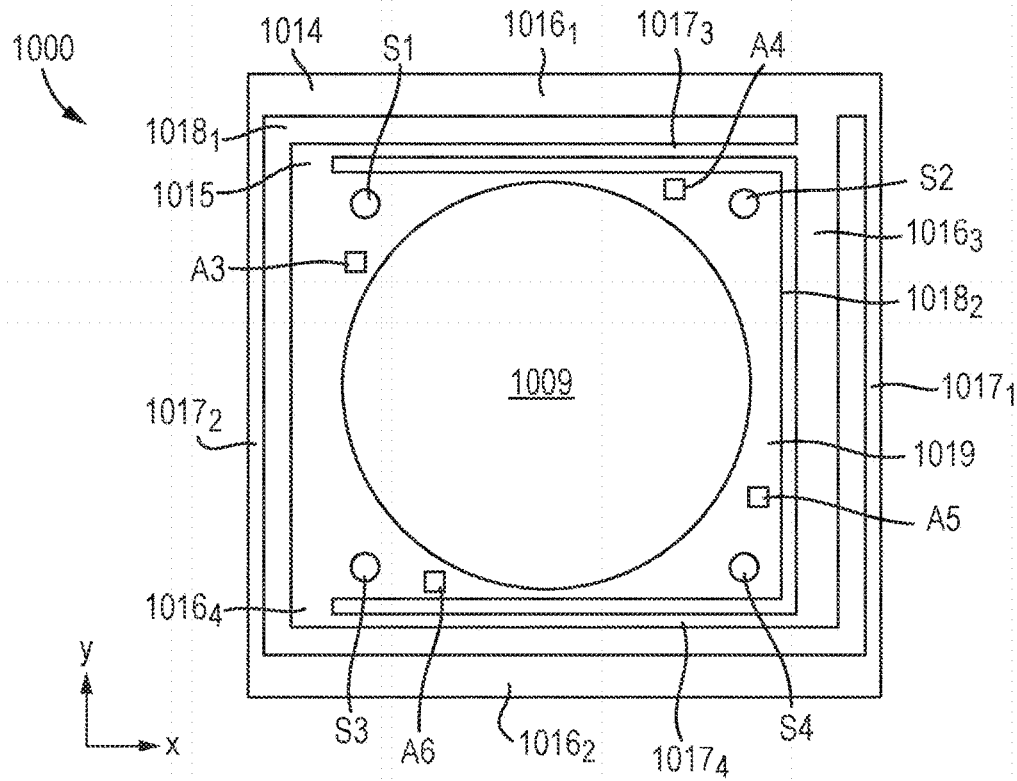
FIG. 3A is a plan view of a first suspension system of the folded camera assembly of FIG. 1.
Figure 3B:
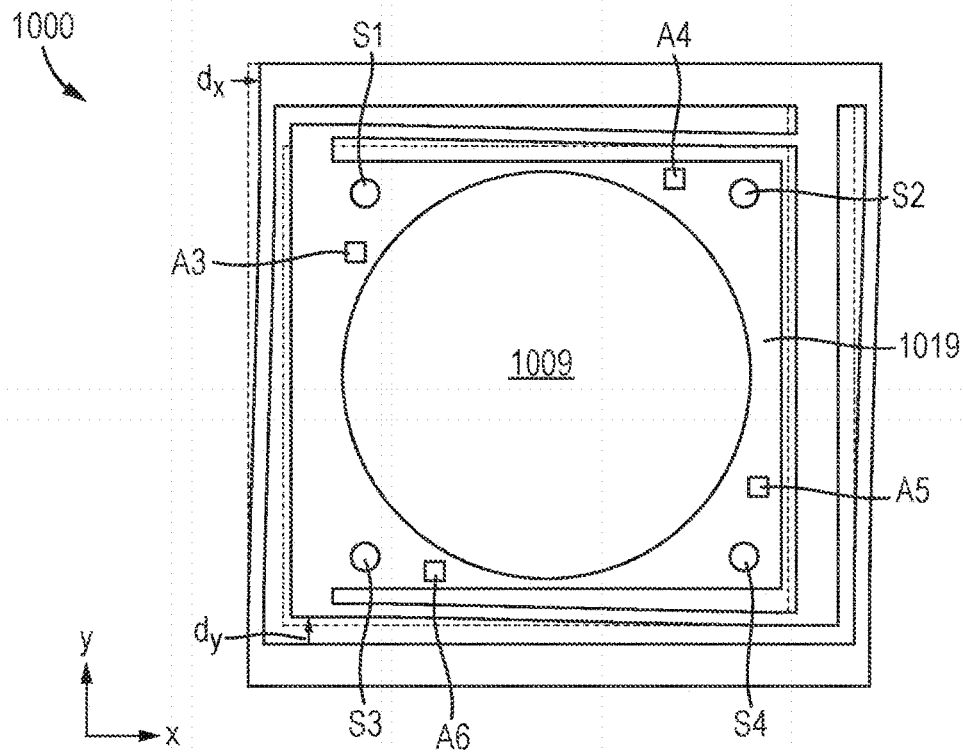
FIG. 3B is a plan view of a deformed state of the first suspension system of FIG. 3A.
Figure 4A:
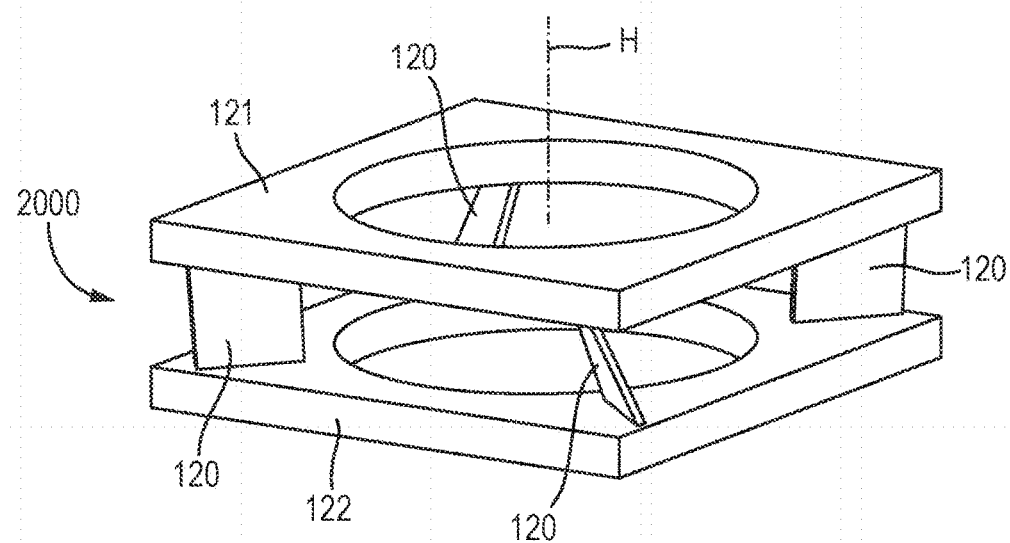
FIG. 4A is a perspective view of a second suspension system of the folded camera assembly of FIG. 1.
Figure 4B:
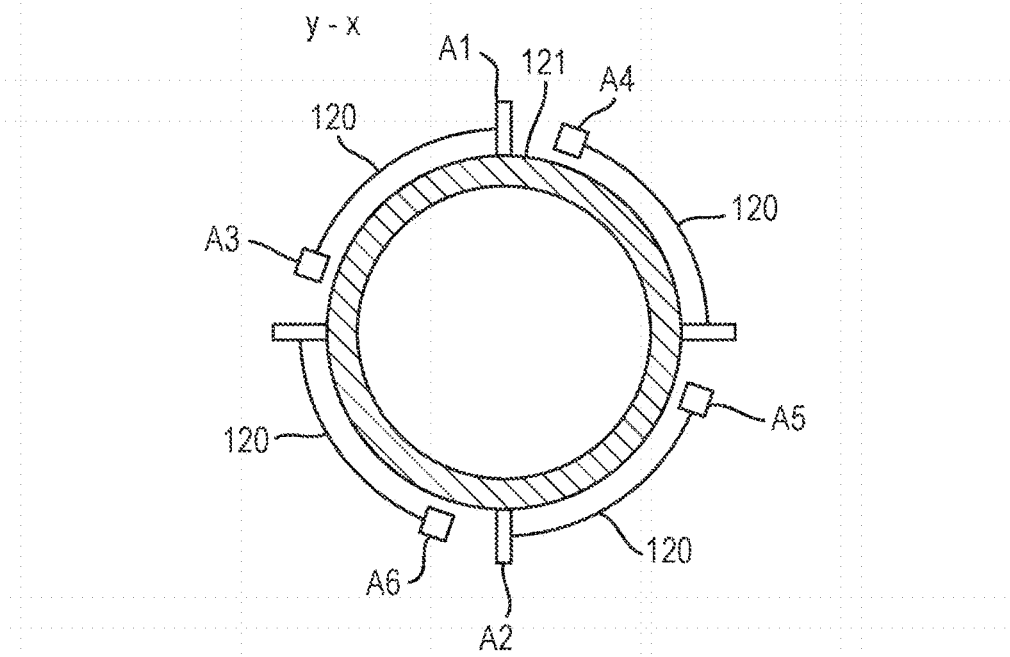
FIG. 4B is an end view of the second suspension system of FIG. 4A.

The SMA actuator assembly 100 has four main components, i.e. two frames $100a_1$, $100a_2$ (see FIG. 2A), a first suspension system 1 (see FIGS. 3A and 3B) and a second suspension system (see FIGS. 4A and 4B). These components $100a_1$, $100a_2$, 1000, 2000, are connected to each other and/or to the housing 51 as will be explained below.

Figure 2A:
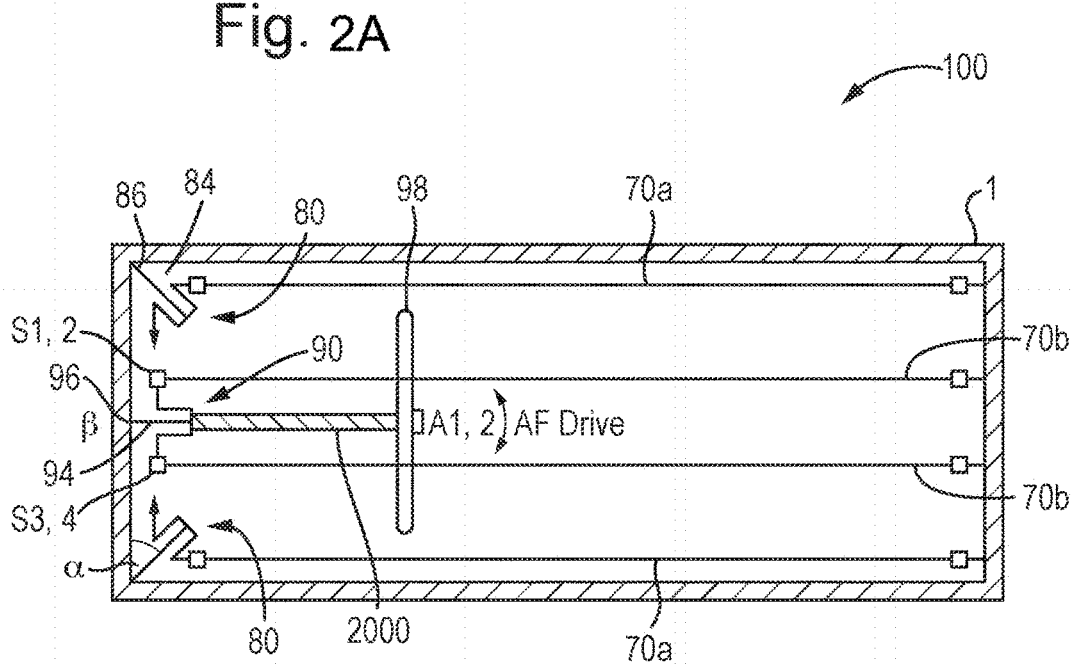
FIG. 2A is a schematic sectional side view of a folded camera assembly of FIG. 1.
Figure 2B:
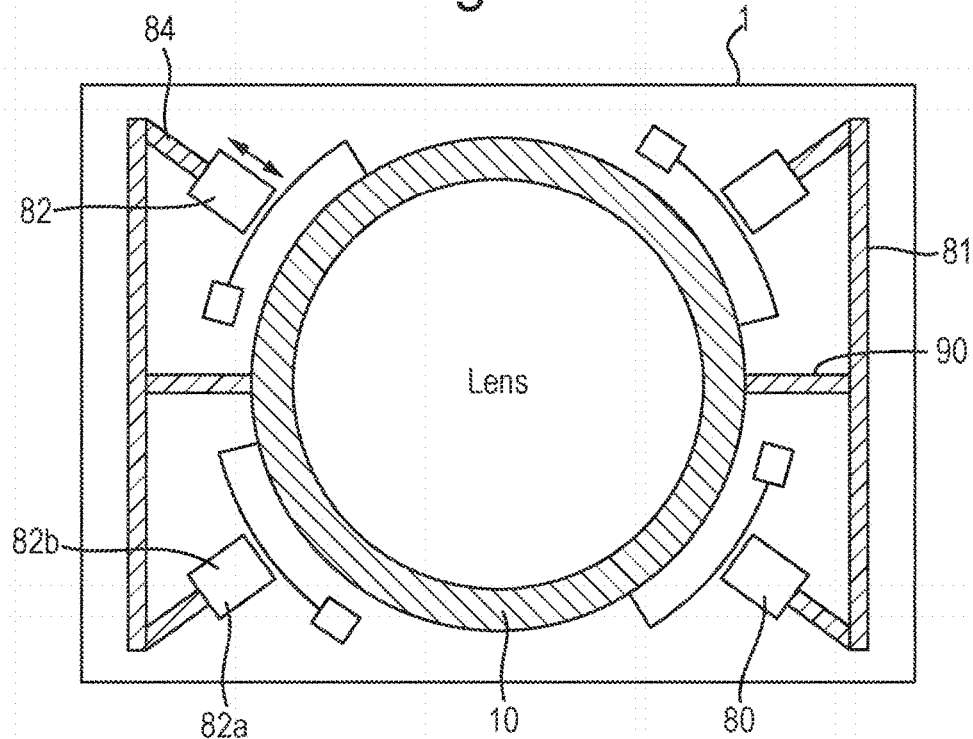
FIG. 2B is an end view of a folded camera assembly of FIG. 1.

Referring also to FIGS. 2A and 2B, the two frames $100a_1$, $100a_2$ will now be described in more detail. The frames $100a_1$, $100a_2$ are fixedly attached to (the inwards-facing surfaces of) opposite sidewalls of the housing 51, e.g. the walls parallel to the YZ plane. In this example, each frame 100a has a generally oblong shape with two long edges, which are aligned with the optical axis O, and two short edges. The length and/or width of the frame 100a may be similar to that of the wall of the housing 51 to which it is attached.

Each frame 100a holds a first pair of SMA wires 70a and a second pair of SMA wires 70b, and so the camera assembly 50 as a whole includes a first set of four SMA wires 70a and a second set of four SMA wires 70b. The first set of SMA wires 70a is responsible for carrying out OIS, and the second set of SMA wires 70b is responsible for carrying out AF.

Each of the SMA wires 70a, 70b extends along the optical axis O. In other examples, one or more of the SMA wires 70a, 70b may extend at a shallow angle (e.g. at <45° or <20° or <10° or)<5° to the optical axis O. As will be explained in more detail below, each of the SMA wires 70a, 70b has one end fixedly attached, e.g. via a crimp, to a short edge of frame 100a (and hence to the housing 51), and the other end connected, via a crimp, to a force-modifying flexure 84, 94 near the other short edge of the frame 100a. The crimps are drawn as small squares in FIG. 2A. When the SMA wires 70a, 70b contract, they apply input forces to the force-modifying mechanisms 80, 90. These input forces are primarily along the longitudinal axis z, i.e. their component along the longitudinal axis z is larger than any component perpendicular to the longitudinal axis z. Broadly speaking, the force-modifying mechanisms 80, 90 are configured to modify these input forces and to provide output forces which are in different directions, and which may have different magnitudes. Such an arrangement takes advantage of the extended length of the camera assembly 50 to accommodate longer SMA wires 70a, 70b and, as such, can increase the range of movement (i.e. stroke) and/or force provided by the SMA actuator 100.

The first pair of SMA wires 70a each extend along a long edge of each frame 100a. Hence, the first set of SMA wires 70a extend along the four long edges of the housing 51. By energising one or more of the first set of SMA wires 70a, the SMA actuator assembly drive movement in the lens carriage 10 in any direction in the x-y plane, thus providing OIS for the camera assembly.

Each of the first set of SMA wires 70a is connected to a 'first' force-modifying flexure 84. Each first force-modifying flexure 84 is connected to a corner of the frame 100a and extends in a direction that is angled relative to both the XY plane (see FIG. 2A) and the YZ plane (see FIG. 2B).

OIS Actuating Unit

Each first SMA wire 70a forms part of a so-called OIS actuating unit 80 (also sometimes referred to as simply a flexure). Each OIS actuating unit 80 comprises a body portion 82 to which several components are connected.

Each OIS actuating unit 80 further comprises a force-modifying flexure 84. The force-modifying flexure 84 is connected between the body portion 80a and the frame 101a. One end of the force-modifying flexure 84 is connected to the body portion 80a. The other end of the force-modifying flexure 84 is connected to the frame 101a. The force-modifying flexure 84 may, on flexing, allow the body portion 80a to move relative to the frame 101a in a direction that is substantially orthogonal to the force-modifying flexure 84. The force-modifying flexure 84 effectively allows the body portion 80a to pivot relative to the frame 101a.

The OIS actuating unit 80 further comprises an SMA wire 70a. The SMA wire 70a is connected between the body portion 80a and the frame 101a. One end of the SMA wire 70a is connected to the frame 101a, in particular by a crimp (the small squares in the figures). The other end of the SMA wire 70a is connected to the body portion 80a, in particular by a crimp 35.

The OIS actuating unit 80 further comprises a coupling flexure 83. The coupling flexure 83 is connected between the body portion 80a and the movable part 1019 of the first suspension system 101b. One end of the coupling flexure 83 is connected to the body portion 80a. The other end of the coupling flexure 83 is connected to the movable part 1019, in particular via a connection point S1-4.

The SMA wire 70a is arranged, on contraction, to apply an input force on the body portion 80a. The input force acts parallel to the length of the SMA wire 70a. The force-modifying flexure 84 is arranged to modify the input force so as to cause the coupling flexure 83 to apply an actuating force to the movable part 1019. In particular, in the depicted embodiment the force-modifying flexure 84 is placed in tension on contraction of the SMA wire 70a. The force-modifying flexure 84 is arranged at an angle relative to the SMA wire 70a. As a result, the body portion 80a is arranged, on SMA wire contraction, to move at an angle relative to the length of the SMA wire 70a. The force-modifying flexure 84 thus converts the input force, in particular the magnitude and direction thereof, into the actuating force.

The OIS actuating unit 80 can be configured to amplify movement or to amplify force due to contraction of the SMA wire 70a.

In some embodiments, at least one OIS actuating unit 80, preferably each OIS actuating unit 80, is configured such that the force-modifying flexure 84 amplifies an amount of contraction of the SMA wire 70a to a relatively greater amount of movement of the movable part 1019 relative to the frame 101a. Such amplification, for example, may be by a factor greater than 1.5, preferably greater than 2, further preferably greater than 3. This may be achieved, for example, by appropriate selection of the angle between the force-modifying flexure 84 and the SMA wire 70a. The angle may be in the range from 0 to 45 degrees, preferably from 13 to 40 degrees.

The coupling flexure 83 is compliant in a direction perpendicular to the actuating force. This allows the movable part 1019 to move in a direction perpendicular to the actuating force, and in a direction perpendicular to the coupling flexure 83, for example due to actuation of a different OIS actuating unit 80.

In the above-described embodiments, the force-modifying flexure 84 is placed in tension on contraction of the SMA wire 70a. This can reduce the risk of buckling of the force-modifying flexure 84. However, in general, the force-modifying flexure 84 could also be arranged so as to be placed under compression on contraction of the SMA wire 70a.

Further details and alternative examples of actuating units are described in WO2022084699, which is incorporated by reference.

In the above-described embodiments, the force-modifying flexure 84 and the SMA wire 70a connect at one end to the frame 101a, and the coupling flexure 83 connects at one end to the movable part 1019. In general, this arrangement may also be reversed, with the force-modifying flexure 84 and the SMA wire 70a connecting at one end to the movable part 1019, and the coupling flexure 83 connecting at one end to the frame 101a.

Figure 2C:
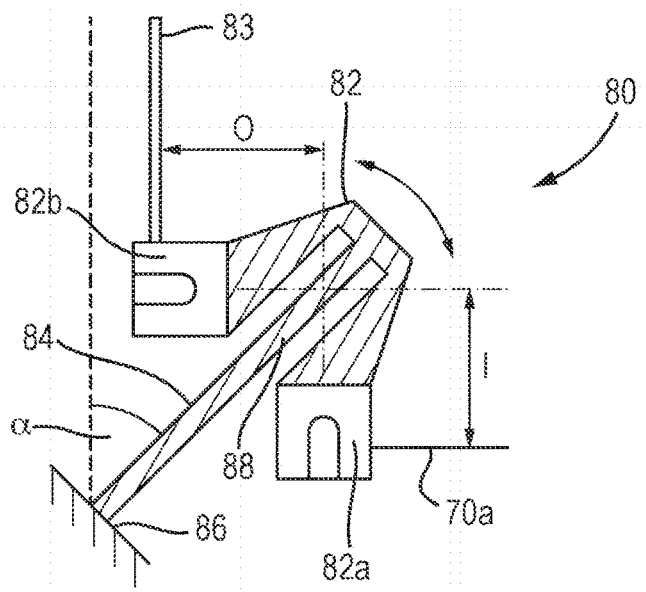
FIG. 2C is an enlarged side view of a flexure of FIG. 1.

Referring to FIGS. 2A to 2C, each of the first set of SMA wires 70a is connected between a distal end of the frame 1, and a flexure body 82 (or a movable portion) of the flexure 80 at wire attaching point 82a, towards a proximal end of the frame 1. The flexure body 82 is fixedly or hingedly attached to a first suspension system at connection points S1-4, by a coupling link 83 at suspension attaching point 82b.

This way, the lens carriage 10 is mechanically connected to the SMA wires 70a by the flexure body 82, the coupling link 83 and the first suspension system. In some other embodiments, the first suspension system may comprise sliding (plain) bearings or ball bearings with suitable preload (e.g. with a spring) to ensure sufficient tilt control. Alternatively, in some embodiments, there may be provided two or more of these flexures in parallel to improve tilt control. In some other embodiments, the first set of SMA wires 70a connects directly with the lens carriage without the use of the first suspension system.

The flexure 80 is fixedly attached to a first connection point 86 at the proximal end of the frame 1 by a flexure arm 84 (or force-modifying flexure). Thus, during contraction of the SMA wire 70a, the flexure body 82 rotates about and/or translates relative to the first connection point 86.

In the illustrated embodiment, the first connection point 86 for each of the flexures 80 is provided at a vertex of the frame 1. That is, the first connection points 86 are located at the vertexes (at the intersections between two sidewalls and the endwall) at the proximal end of the frame 1. The flexure arm 84 extends at an angle of 45° relative to X, Y and Z axes, e.g. as shown in FIG. 2B the flexure arms 84 each extends diagonally from a respective vertex of the frame 1. In some other embodiments, the first connection points 86 may be located at midpoints of intersections between the sidewalls and the end wall at the proximal end of the frame 1, e.g. edges at the proximal end of the frame 1.

As shown in FIGS. 2A and 2C, the flexure 80 extends from the first connection point 86 at an angle α with respect to a plane perpendicular to the longitudinal axis z. In the illustrated embodiment, the flexure 80 extends from the first connection point at 45° with respect to a plane perpendicular to the longitudinal axis z. Thus, as the SMA wires 70a contract, it draws a first end of the flexure body 82 (distal to the moveable element) along the optical axis, and thereby deforms (or bends) the flexure arm 84 into a direction towards the sidewalls of the frame 1 (and away from the central axis of the frame 1). Consequently, the flexure body 82 rotates about and/or translate relative to the first connection point 86, thus moves the flexure body along the arrows as shown in FIG. 2B. Such movement pushes on the first suspension system 1000 to move the lens carriage away from the central axis, in a direction perpendicular to the longitudinal axis z.

Referring to FIG. 2A again, as well as FIG. 2C, the movement of the lens carriage may be amplified by changing the positions of the crimps (e.g. the input force and output force relative to the flexure body. That is, a greater stroke may result from the same amount of contraction in the SMA wire. More specifically, as shown in FIG. 2C, the behaviour of the flexure depends heavily on the configuration of the flexure 80. In the proposed arrangement, there exists an instantaneous virtual rotation centre 88 for the moveable portion on the flexure 80 upon contraction in the SMA wire 70a. The amplification, or gearing, of the flexure system is then determined by the distance of the input and output from this virtual rotation centre 88. That is, gearing can be defined by the quotient of output distance O and input distance I, i.e. O/I.

FIG. 3A shows a sectional view of the first suspension system 1000. The first suspension system 1000 can also be referred to as a non-rotating general bearing, or "two-by-two-bar link" and serves to restrict rotation and tilting of the lens carriage 10.

The first suspension system 1000 includes an outer two-bar link 1014 which is mechanically in series with an inner two-bar link 1015. The outer two bar link 1014 is formed from first and second rigid portions $1016_1$, $1016_2$ elongated in a direction parallel to the x axis and connected together in a direction parallel to the y axis using first and second beam portions (flexures) $1017_1$, $1017_2$. The inner two-bar link 1015 is formed from third and fourth rigid portions $1016_3$, $1016_4$ elongated in a direction parallel to the y axis and connected together in a direction parallel to the x axis using third and fourth beam portions (flexures) $1017_3$, $1017_4$. The inner two-bar link 1015 is connected to the outer two bar link 1014 using the third rigid portion $1016_3$ which connects directly to the first rigid portion $1016_1$. With the exception of this connection, the inner two-bar link 1015 is separated from the outer two-bar link 1014 by a first gap $1018_1$ which provides space for lateral deflection of the first and second beam portions $1017_1$, $1017_2$. A central portion 1019 is located within the inner two-bar link 1015 and connected to the fourth rigid portion $1016_4$ by a rigid connecting portion 1020. Aside from the rigid connecting portion 1020, the central portion 1019 is separated from the inner two-bar link 1015 by a second gap $1018_2$ providing space for lateral deflection of the third and fourth beam portions $1017_3$, $1017_4$. The central portion 1019 defines a central aperture 1009.

The difference between "rigid" and "beam" portions in this specification is not absolute and is determined by relative flexural rigidity as defined e.g. by the respective cross-sectional areas. Beam portions are less resistant to bending, at least in the desired directions, than rigid portions.

The flexures 80 are connected to the first suspension system 1000 at connection points S1-S4 at respective corners of the central portion 1019. Thus, as the flexures 80 draws on the central portion 1019 of the first suspension system 1000, it moves the lens carriage 10 toward the corresponding direction. An example is given in FIG. 3B, where the first suspension system 1000 is deformed upon energising the SMA wire 70a corresponding to connection point S2.

If the second rigid portion $1016_2$ is clamped or fixed (e.g. to the frame 1), then bending of the first and second beam portions $1017_1$, $1017_2$ permits movements Tx, Tz in directions substantially parallel to the x and/or z axes, as well as rotations Rx, Ry about the x and/or y axes. Similarly, relative to the third rigid portion $1016_3$, the fourth rigid portion $1016_4$ and connected central portion 1019 permits movements corresponding to Ty, Tz, Rx and/or Ry. Overall, this permits motion of the central portion 1019 relative to the clamped second rigid portion $1016_2$ corresponding to Tx, Ty, Tz, Rx and/or Ry, and constraining only rotation Rz about the primary axis z. For example, FIG. 3B illustrates a relative displacement d of the central portion 1019 relative to the second rigid portion $1016_2$ having a component $d_x$ parallel to the x axis and a component $d_y$ parallel to the y axis.

Referring to Figured 2A and 2B again, the second set of SMA wires 70b are arranged at the periphery of the frame 1. That is, in the illustrated example, the SMA wires 70b each extends along a sidewall of the frame 1 and opposite each other. By providing the SMA wires 70b at the periphery, such an arrangement may advantageously distance the SMA wires 70b from the lens carriage, and thus provides sufficient room to accommodate its movements. In addition, the second set of SMA wires 70b are distanced from the first set of SMA wires 70a such that the two sets of SMA wires 70a, 70b do not interfere with each other. In some other embodiments, the first set of SMA wires 70a may each longitudinally extend along a central portion of a sidewall.

The second set of SMA wires 70b comprises two (or more) SMA wires, each extending along the length of opposite sidewalls of the frame 1. By energising the SMA wires 70b, the SMA actuator assembly drives movement of the lens carriage 10 in opposing direction along the longitudinal axis z, thus providing AF and/or zoom for the camera assembly. In some other embodiments, a single SMA wire may extend along a sidewall of the frame 1 to drive movement in the lens carriage 10 in one direction. For example flexures may be provided to maintain the tension in the SMA wire, as well as providing a returning force.

Referring to FIGS. 2A and 4B, the second set of SMA wires 70*b* is connected between the frame 1 at a distal end of the frame 1, and a flexure body 92 of the flexure 90 towards the proximal end of the frame 1. The flexure body 92 is also fixedly or hingedly attached to a second suspension system 2000 at connection points A1 and A2, such that the SMA wires 70*b* is mechanically connected to the lens carriage 10 by the flexure body 92 and the second suspension system 2000. Alternatively, in some other embodiments, the suspension system may comprise sliding (plain) bearings or ball bearings with suitable pre-load (e.g. with a spring) to ensure good tilt control. In some other embodiments, the second set of SMA wires 70*b* connects directly to the lens carriage 10 without the use of the second suspension system 2000.

Each flexure 90 is fixedly attached, at an angle β, to second connection point 96 at the midpoint of an intersection between a sidewall and the proximal endwall of the frame 1 by a flexure arm 94, thus allowing the flexure body 92 to rotate about and/or translate relative to the second connection points 96. In some other embodiments, the second connection points 90 may be located at diagonally opposite vertices of the frame 1.

The SMA actuator assembly 100 further comprises AF flexures 98 connected to the sidewall of the frame 1 and the second suspension system (at A1,A2 shown in FIG. 4B), each having a lever arm to allowed for movement in the optical axis. The AF flexures 98 extend, from the sidewall of the frame 1, perpendicularly to the optical axis.

As the SMA wires 70*b* contract, it draws a respective end of the flexure 90 longitudinally along the optical axis, and thereby deforms (or bends) the flexure arm 94. Consequently, the flexure 90 rotates about and/or translates relative to the second connection point 96, thereby rotates a moveable plate 121 of the suspension system 2000 to translate the lens carriage along the longitudinal axis z. More information of the suspension system 2000 is given below.

Referring to FIG. 2A again, the movement in the lens carriage may be amplified by adopting a different angle β. That is, a greater stroke may result from the same amount of contraction in the SMA wire. More specifically, when the flexure arm 94 extends from the second connection point at a non-zero angle β relative to the plane perpendicular to longitudinal axis z, e.g. at 15° or at 30°, the contraction in SMA wire would cause a greater rotation in the flexure body 92, thereby improves the gearing of the flexure 90.

FIG. 4A shows a perspective view of a known second suspension system 2000. The second suspension system 2000 can also be referred to a helical bearing, and serves to convert rotation (in the flexure 90) into translation along the longitudinal axis. The details of the helical bearing as disclosed in WO2019/243849 is fully incorporated herein by reference.

The helical bearing 2000 supports (or mounted therein) the lens carriage 10 on the first suspension system 1000. The helical bearing 2000 is arranged to guide helical movement of the lens carriage 10 with respect to the first suspension system 1000 around a helical axis H. The helical axis H in this example is coincident with the longitudinal axis z. Preferably, the helical motion is along a right helix, that is a helix with constant radius, but in general any helix is possible. The pitch of the helix may be constant or vary along the helical motion. Preferably, the helical movement is generally only a small portion (less than one quarter) of a full turn of the helix.

The helical motion of the lens carriage 10 guided by the helical bearing 2000 includes a component of translational movement along the helical axis H and rotational movement around the helical axis H. The translational movement along the helical axis H is the desired movement of the lens carriage 10, for example to change the focus of the image on the image sensor 20 and/or to change the magnification (zoom) of the image on the image sensor 20. The rotational movement around the helical axis H is in this example not needed for optical purposes, but is in general acceptable as rotation of the lens element 10 does not change the focus of the image on the image sensor 20.

As shown in FIGS. 4A and 4B, the helical bearing 2000 comprises plural (four) flexures 120, although in general any number of flexures 120 could be provided. In this example, the helical bearing 2000 comprises a movable plate 121 with the lens carriage 10 mounted thereon (or therethrough), wherein the moveable plate 121 is connected to, at connection points A1 and A2, the flexure body 92.

The helical bearing 2000 further comprises a support plate 122 mounted on the first suspension system 1000 at connection points A3-A6 as shown in FIG. 4B (also shown in FIG. 3B). More specifically, the support plate 122 of the second suspension system 2000 is fixedly connected, at connection points A3-A6, to the central portions 1019 of the first suspension system 1000. As the support plate is fixedly attached to the first suspension system, it does not rotate relative to the frame 1 upon activating SMA wires 70*b*.

The moveable plate 121 and the support plate 122 in the known second suspension system as shown in FIG. 4A are rectangular plates. However, when adapted for use in the present invention, the moveable plate 121 and the support plate 122 are circular plates. As the SMA wires 70*b* contract, they rotate the moveable plate around the optical axis, and by the flexure 120, move the moveable plate 121 and the support plate 122 towards each other. With this arrangement, the flexures 120 guide the helical movement of the moveable plate 121, and therefore the lens carriage 10 with respect to the central portion 1019 around the helical axis H.

Figure 5:
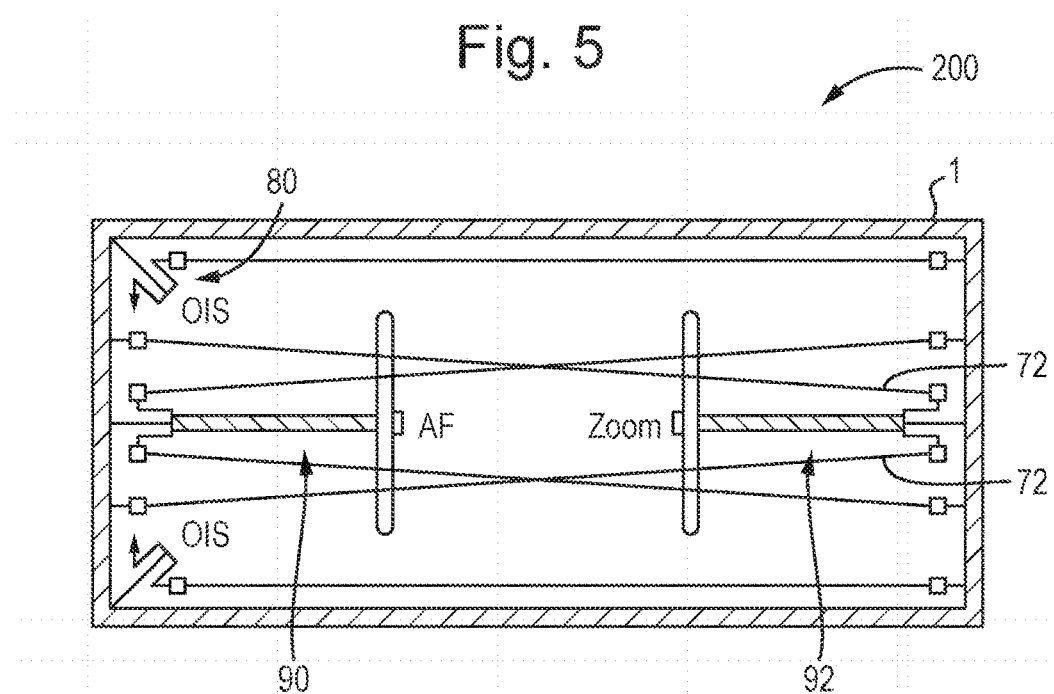
FIG. 5 is a schematic sectional side view of a folded camera assembly according to a second embodiment of the present invention.

FIG. 5 is a schematic cross-sectional view of a camera assembly incorporating an SMA actuator assembly 200 according to a second embodiment of the present invention. The SMA actuator assembly 100 is structurally and functionally similar to the SMA actuator assembly 200, apart from having an additional pair of SMA wires 72 and corresponding additional flexure 92 for effecting zoom in the camera. More specifically, the additional SMA wires 72 and additional flexure 92 are provided on the half of the frame 1 opposite to, and in mirrored configuration to, the SMA wires 70*b* and flexure 90 that drives AF. For example, as the SMA wires 72 contract, they may drive an additional lens carriage (having a zoom lens) in an opposite direction to the lens carriage 10 (having the AF lens).

Other Variations

In each of the OIS actuating units, the actuating force need not be in a substantially radial direction relative to the primary axis. Instead, the actuating forces may be directed as described in WO2022084699.

Alternative Actuator Assembly

Figure 6:
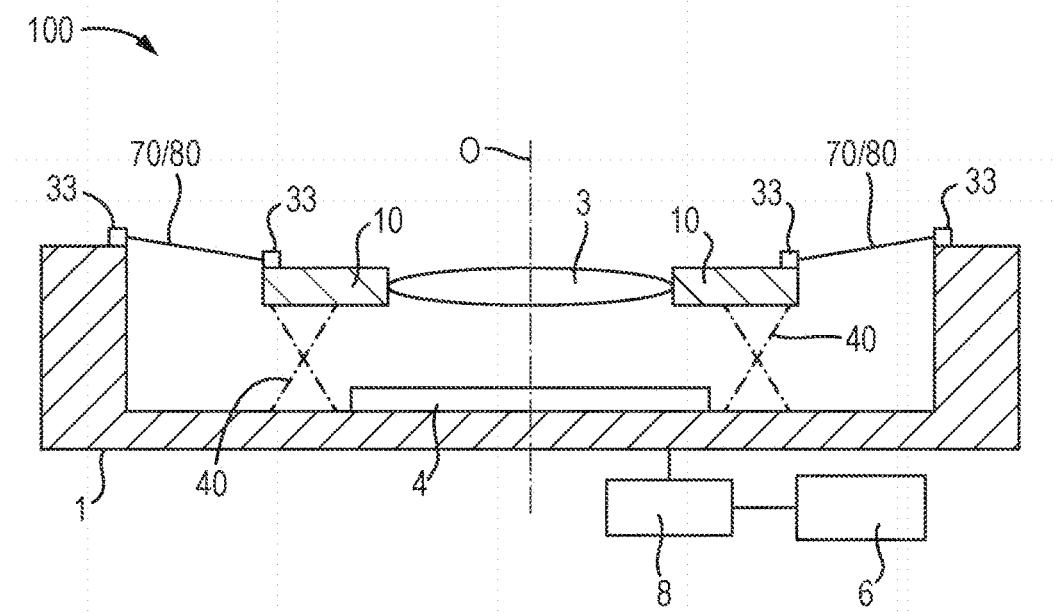
FIG. 6 is a schematic sectional side view of an actuator assembly according to another embodiment of the present invention.

FIG. 6 schematically depicts a side view of another embodiment of the actuator assembly 100 according to the present invention. The actuator assembly 100 comprises a support structure 1, *which* may correspond to the frame 1 or other base or reference structure. The actuator assembly 100 further comprises a movable part 10. In the depicted embodiment, the movable part 10 corresponds to the lens carriage 10, but in general the movable part 10 may be any part that is movable relative to the support structure 1.

The movable part 10 is supported on the support structure 1. The movable part 10 is movable relative to the support structure 1. For example, the movable part 10 may be supported in a manner allowing movement of the movable part 10 relative to the support structure 1 along two orthogonal axes (i.e. in a plane) that are perpendicular to a primary axis O. Movement along the axis O may be constrained or prevented. Alternatively, the movable part 10 is supported in a manner allowing rotation of the movable part 10 relative to the support structure 1 about two orthogonal axes that are along the primary axis O. Translational movement may be constrained or prevented. The primary axis O coincides with the optical axis O of optical components (such as a lens 3) fixed to the actuator assembly 100.

The actuator assembly 100 of FIG. 6 comprises one or more SMA wires 70 and/or actuating units 80. The SMA wires 70 are also referred to as SMA elements 70 herein, and the terms SMA wire 70 and SMA element 70 are used interchangeably. The actuating units 80 may correspond in essence to the OIS actuating units described above. The SMA wires 70 are connected in tension between the support structure 1 and the movable part 10. The SMA wires 70 are connected at their ends (either directly or via an intermediate component, such as the actuating unit 80) to the support structure 1 and/or to the movable part 10 using connection elements 33, for example crimp connections. The crimp connections may crimp the SMA wires 70 to hold the SMA wires 70 mechanically, as well as providing electrical connections to the SMA wires 70. However, any other suitable connections may alternatively be used. The SMA wires 70 are capable, on selective contraction, of driving movement of the movable part 10 with respect to the support structure 1 in one or more degrees of freedom. Preferably, the SMA wires 70, on selective actuation, drive movement of the movable part 10 with respect to the support structure 1 in two degrees of freedom.

The movable part 10 may be supported (so suspended) on the support structure 1 exclusively by the SMA wires 70 and/or actuating units 80. However, preferably, the actuator assembly 100 comprises a bearing arrangement 40 that supports the movable part 10 on the support structure 1. The bearing arrangement 40 may have any suitable form for allowing movement of the movable part 20 with respect to the support structure 10. For this purpose, the bearing arrangement 40 may, for example, comprise a rolling bearing, a flexure bearing or a plain bearing.

Optionally, the actuator assembly comprises a lens assembly 3 and an image sensor 4. The lens assembly 3 comprises one or more lenses configured to focus an image on the image sensor 4. The image sensor 4 captures an image and may be of any suitable type, for example a charge coupled device (CCD) or a CMOS device. The lens assembly 3 comprises a lens carrier, for example in the form of a cylindrical body, supporting the one or more lenses. The one or more lenses may be fixed in the lens carrier, or may be supported in the lens carrier in a manner in *which* at least one lens is movable along the optical axis O, for example to provide zoom or focus, such as auto-focus (AF). The actuator assembly 100 may thus be incorporated in a miniature camera apparatus in *which* the or each lens of the lens assembly 3 has a diameter of 20 mm or less, preferably of 12 mm or less.

In the embodiment shown in FIG. 6, the movable part 20 comprises the lens assembly 3. The image sensor 4 may be fixed relative to the support structure 1, i.e. mounted on the support structure 1. In other embodiments (not shown), the lens assembly 3 may be fixed relative to the support structure 1 and the movable part 10 may comprise the image sensor 4. In either embodiment, in operation the lens assembly 3 is moved relative to the image sensor 4. This has the effect that the image on the image sensor 4 is moved and/or changed in focus. So, optical image stabilization (OIS) may be implemented by the actuator assembly 100.

The actuator assembly 100 may further comprise a controller 8. The controller 8 may be implemented in an integrated circuit (IC) chip. The controller 8 generates drive signals for the SMA wires 70. SMA material has the property that on heating it undergoes a solid-state phase change that causes the SMA material to contract. Thus, applying drive signals to the SMA wires 70, thereby heating the SMA wires 70 by allowing an electric current to flow, will cause the SMA wires 30 to contract and move the movable part 10. The drive signals are chosen to drive movement of the movable part 10 in a desired manner, for example so as to achieve OIS by stabilizing the image sensed by the image sensor 4. The controller 8 supplies the generated drive signals to the SMA wires 70.

Optionally, the camera apparatus comprises a vibration sensor 6. The vibration sensor 6 may be a gyroscope sensor, for example, although in general other types of vibration sensor 6 could be used. The vibration sensor 6 detects vibrations that the actuator assembly 100 is experiencing and generates output signals representative of the vibration of the actuator assembly 100. The controller 8 receives the output signals and generates the drive signals for the SMA wires 70 in response to the output signals, for example so as to counteract the vibrations represented by the output signals. The controller 8 may thus control actuation of the SMA wires 70 to achieve OIS. In such embodiments, the The actuator assembly 100 may comprise a support structure, movable part and bearing arrangement arranged as described in WO2013/175197 A1 or in WO2017/072525 A1, each of *which* is herein incorporated by reference. The actuator arrangement for driving movement of the movable part 10 relative to the support structure 1 is different according to the present invention, as described with reference to FIGS. 7 and 8.

Actuator Assembly Comprising SMA Wire and Actuating Unit

Figure 7:
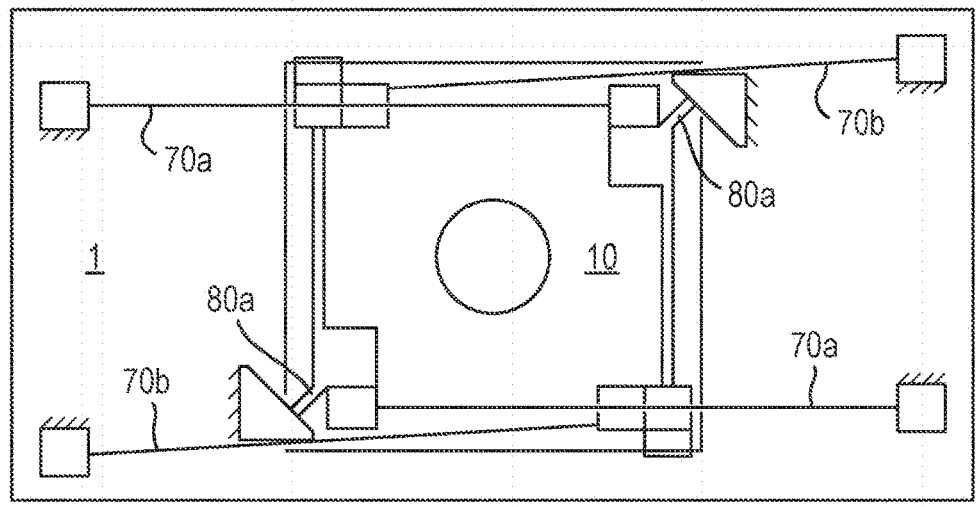
FIG. 7 is a schematic plan view of an embodiment of the actuator assembly of FIG. 6.

FIG. 7 schematically depicts a plan view of the actuator assembly 100 according to FIG. 6. For ease of illustration, only some of the reference numerals shown in FIG. 6 are reproduced in FIG. 7.

The actuator assembly 100 comprises two SMA wires 70*b*, also referred to as two first SMA wires 70*b*. The two SMA wires 70*b* each are arranged, on actuation, to apply a force on the movable part 10 relative to the support structure 1 along a first axis (e.g. the x axis). The two SMA wires 70*b* may thus, on actuation, move the movable part 10 relative to the support structure 1, e.g. translationally along a first axis (e.g. the x axis). The two SMA wires 70*b* may be arranged in opposition, such that the two SMA wires 70*b* apply forces to the movable part 10 in opposite directions along the first axis (e.g. the x axis).

In FIG. 7, the two SMA wires 70*b* are directly connected between the support structure 1 and the movable part 10. For example, one end of each of the two SMA wires 70*b* may be connected by a crimp or other connection element 33 that is fixed relative to the movable part 10, and the other end of each of the two SMA wires 70*b* may be connected by a crimp or other connection element 33 that is fixed relative to the support structure 1.

The actuator assembly 100 further comprises two actuating units 80a. The two actuating units 80a in essence correspond to the OIS actuating units 80 described above. The two actuating units 80a each are arranged, on actuation, to apply a force on the movable part 10 with a component (e.g. a major component) along a second axis (e.g. the y axis). The first axis and the second axis are orthogonal to each other. The two actuating units 80a may apply a force on the movable part 10 exactly along the second axis (e.g. the y axis). The two actuating units 80a may thus, on actuation, move the movable part 10 relative to the support structure 1, e.g. translationally along a second axis (e.g. the y axis). The two actuating units 80a may be arranged in opposition, such that the actuating units 80a apply forces to the movable part 10 in opposite directions along the first axis (e.g. the x axis).

Each actuating unit 80a comprises a force-modifying mechanism. In FIG. 7, the force modifying mechanism is embodied by a force-modifying flexure and is connected at one end to the support structure 1. The other end of the force-modifying mechanism (i.e. the free end) is movable relative to the support structure 1. In general, the force modifying mechanism may equally be connected at the one end to the movable part 10. The force-modifying mechanism may instead be embodied by a lever arm (e.g. a rigid arm fixed at one end by a pivot) or multi-diameter roller, and need not comprise a force-modifying flexure. In general, any mechanism capable of redirecting a force may be used as the force-modifying mechanism.

Each actuating unit 80a further comprises a coupling link, embodied in FIG. 7 as a coupling flexure. The coupling link is connected in FIG. 7 at one end to the force modifying mechanism (in particular to the free end thereof) and at the other end to the movable part 10. In general, the coupling link may instead be connected at the other end to the support structure 1, and may be embodied by any suitable compliant coupling, e.g. comprising ball bearings or plain bearings.

Each actuating unit 80a further comprises a second SMA element 70a. The second SMA element 70a is connected at one end to the support structure 1 and at the other end to the force modifying mechanism (in particular to the free end thereof). In general, the second SMA element 70a may instead be connected at the one end to the movable part 10. The SMA element 70a is arranged, on actuation, to exert an input force on the force-modifying mechanism with a component (e.g. a major component) along the first axis (e.g. the x axis). The SMA element 70a may be arranged to exert the input force along the first axis. This causes the force-modifying mechanism to apply an output force on the coupling link, and in turn causes the coupling link to apply an actuating force on the movable part 10 with a component along the second axis (e.g. the y axis). So, the force-modifying mechanism may re-direct the input force acting along the first axis into the output force acting along the second axis.

So, the first SMA elements 70b and the second SMA elements 70a both apply actuating forces with a component along the first axis (e.g. the x axis). The first and second SMA elements 70a, 70b may both act along the first axis. The first and second SMA elements 70a, 70b may both have a longitudinal extent (i.e. the first and second SMA wires may both have a length) along the first axis. As shown in FIG. 7, for example, the first and second SMA elements 70a, 70b may both be embodied by SMA wires 70a, 70b that are parallel to each other. Providing parallel SMA wires 70a, 70b may allow the footprint actuator assembly 100 to be made more compact along one axis (e.g. the y axis) compared to a situation in which the SMA wires 70a, 70b are perpendicular to each other. Manufacturing of the actuator assembly 100 may also be made simpler by providing parallel SMA wires 70a, 70b. At the same time, the use of the force-modifying mechanism to redirect the actuating force of the second SMA elements 70a allows forces to be applied on the movable part 10 to effect movement in two degrees of freedom.

The benefits of improved compactness and ease of manufacturing are not limited to providing exactly parallel first and second SMA wires 70a, 70b. Indeed, similar benefits are achieved by allowing the first and second SMA wires 70a, 70b to be at a (preferably small) acute angle to each other. For example, the first and second SMA wires 70a, 70b may be arranged at an acute angle that is less than 30 degrees, preferably less than 20 degrees, further preferably less than 10 degrees or less than 5 degrees.

In preferred embodiments, any stroke or force amplification of the SMA wires 70a, 70b is matched to each other. Specifically, the ratio of actuation amount of the second SMA element 70a to the resulting movement of the movable part along the second axis is substantially equal to the ratio of the actuation amount of the first SMA element 70b to the resulting movement of the movable part along the first axis. In embodiments in which the first SMA element 70b is an SMA wire that directly connects to the movable part and/or support structure, this ratio is 1 for the first SMA element 70b. This is because any actuation amount (i.e. SMA wire contraction or stroke) directly moves the movable part 10 by the same amount.

So, the actuating unit 80a may be arranged such that the ratio of actuation amount of the second SMA element 70a to the resulting movement of the movable part along the second axis is substantially equal to 1. Put another way, the actuating unit 80a may be configured to re-direct the input force exerted by the second SMA element 70a without changing the magnitude of the input force, such that the input force is substantially equal to the output force.

In embodiments of the actuating unit 80a making use of a force-modifying flexure, this may be achieved by setting the angle between the second SMA element 70a and the force-modifying flexure to 45 degrees or 135 degrees. As a result, the input force is redirected (by 90 degrees) without a change in magnitude.

In the embodiment of FIG. 7, the first SMA element 70b is connected directly between the movable part 10 and support structure 1. In particular, the first SMA element 70b is connected at one end directly to the movable part 10 via a connection element 33 and at the other end directly to the support structure 1 via a connection element 33. The connection elements 33 may comprise crimps. The connection elements 33 may be respectively fixed to the movable part 10 and support structure 1.

As shown in FIG. 7, a first SMA element 70b and a second SMA element 70a may be provided on the same side of the movable part 10 when viewed along the primary axis O. The movable part 10 may have a substantially rectangular footprint comprising four sides. The four SMA elements may be provided on two opposing sides of the movable part 10. In particular, one first and one second SMA element 70a, 70b are provided at the top side of the movable part 10 and another first and another second SMA element 70a, 70b are provided on the bottom side of the movable part 10. This allows the length of the first and second SMA elements 70a, 70b to be increased, for a given footprint, compared to a situation in which the SMA wires do not both extend along the same side of the movable part 10.

As further shown in FIG. 7, the first and/or second SMA elements 70 may least have a longitudinal extent (i.e. the SMA wires 70 may have a length) that goes beyond the extent of the movable part 20 when viewed along the primary axis O. Put another way, viewed along an axis orthogonal to the primary axis, the first and/or second SMA elements 70 are longer than the movable part 10. This allows the length of the first and second SMA elements 70a, 70b to be increased, for a given footprint of the movable part, compared to a situation in which the SMA wires do not both extend beyond the movable part 10.

Actuator Assembly Comprising Different Types of Actuating Unit

Figure 8:
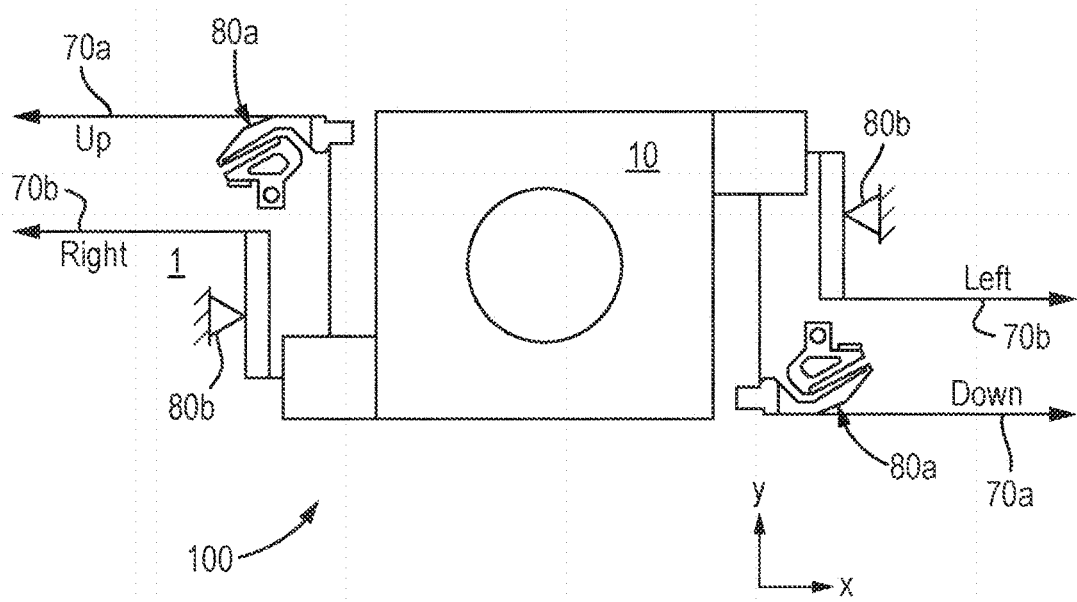
FIG. 8 is a schematic plan view of another embodiment of the actuator assembly of FIG. 6.

FIG. 8 schematically depicts a plan view of another actuator assembly 100 according to FIG. 6. For ease of illustration, only some of the reference numerals shown in FIG. 6 are reproduced in FIG. 8.

In the actuator assembly 100 of FIG. 7, the first SMA elements 70b are connected directly to the movable part 10 and support structure 1. Stroke amplification is not achieved for the first SMA elements 70b in the embodiment of FIG. 7. In some embodiments, it may be preferable to provide a second type of actuating unit 80b (referred to herein as second actuating units 80b) that comprises the first SMA elements 70b, for example to effect stroke or force amplification.

FIG. 8 schematically depicts such an embodiment. Compared to the embodiment of FIG. 7, the first SMA elements 70b are replaced by actuating units 80b. The second actuating units 80b are of a different type to the actuating units 80a comprising the second SMA elements 70a already described in relation to FIG. 7.

In particular, the second actuating units 80b do not necessarily re-direct the actuation force of the first SMA element 70b. Instead, the second actuating units 80 may change the magnitude of the input force exerted by the second SMA elements 70b. The second actuating units 80b may thus comprise a second force-modifying mechanism arranged to amplify an amount of actuation of the first SMA element 30 to a relatively greater amount of movement of the movable part relative to the support structure. The ratio of actuation amount of the first SMA element 70b to resulting movement of the movable part 10 may be greater than 1, preferably greater than 1.5, further preferably greater than 2.

Alternatively, the second actuating units 80b may be used for force amplification. As such, the ratio of actuation force of the first SMA element 70b to the force applied by the force-modifying mechanism on the movable part 10 may be greater than 1, preferably greater than 1.5, further preferably greater than 2.

In the particular embodiment of FIG. 8, the second actuating unit 80b comprises a lever arm. The first SMA element 70b applies an input force to the lever arm. The lever arm converts the input force to an output force that acts on the movable part 10. It will be appreciated that by appropriate selection of the points along the lever arm at which the input force and output force act, the stroke or force amplification may be set as desired. In general, the second actuating unit 80b need not comprise a lever arm, but may correspond in essence to the OIS actuating unit 80 or the actuating unit 80a (comprising a force-modifying flexure, e.g.), for example.

In the embodiments of FIG. 8, any stroke or force amplification of the SMA wires 70a, 70b may be matched to each other. So, the amount of amplification, e.g. stroke or force amplification, of the first actuating units may be equal to that of the amount of amplification of the second actuating units. The amount of amplification of the first actuating unit 80a may be set by appropriately setting the angle between any force-modifying flexure and SMA element.

Arrangement of Forces Applied by SMA Wires and/or Actuating Unit

As shown in FIGS. 7 and 8, the actuating units 80 and/or SMA wires 70 may apply a total of four actuating forces between the movable part 10 and the support structure 1. The actuating forces may be applied to the movable part 10 relative to the support structure 1.

The actuating forces may be perpendicular to the primary axis O, and may be parallel to the movement plane (i.e. the plane in which the movable part 10 is allowed to move). However, in general the actuating forces may be angled relative to the movement plane. The actuating forces may thus have a component along the primary axis O. This component along the primary axis O may be resisted by the bearing arrangement 40, for example, to provide movement of the movable part 10 in degrees of freedom allowed by the bearing arrangement 40. In some embodiment it may even be desirable for actuating forces to have a component in parallel to the primary axis O, for example so as to load plain or rolling bearings arranged between the movable part 10 and the support structure 1.

In the depicted embodiment, the SMA wires 70 and/or actuating units 80 may apply four actuating forces to the movable part 10 so as to move the movable part 10 relative to the support structure 1 to any positions within a range of movement. The range of movement may be within a movement plane that is perpendicular to the primary axis O.

In particular, the two SMA wires 70b of FIG. 7 or the two actuating units 80b of FIG. 8 are arranged to apply actuating forces in opposite directions parallel to the first axis (e.g. the x axis). The two actuating units 80a are arranged to apply actuating forces opposite directions parallel to a second axis (e.g. the y axis), orthogonal to the first axis. By appropriately varying the difference in actuation amount and actuation forces, the movable part 10 may thus be moved independently along the first and second axes. The opposing actuating forces are not colinear, but offset from each other in a direction perpendicular to the actuating forces (and perpendicular to the primary axis). Providing opposing forces allows the tension in the SMA wires 70 (of the actuating units 80) to be controlled, allowing for more accurate and reliable positioning of the movable part 10 compared to a situation in which such actuating forces do not oppose each other.

In embodiments, none of the actuating forces F are collinear. This allows the arrangement of SMA wires 70 and actuating units 80 to translationally move the movable part 10 without applying any net torque to the movable part 10. So, the movable part 10 can be moved translationally in the movement plane without rotating the movable part 10 in the movement plane. In general, the arrangement of SMA wires 70 and actuating units 80 is capable of accurately controlling a torque or moment of the movable part 10 about the primary axis O. So, the arrangement of SMA wires 70 and actuating units 80 is capable of rotating (or not rotating) the movable part 10 relative to the support structure 1 about the primary axis O.

In particular, the two SMA wires 70b in FIG. 7 and the two actuating units 80a in FIG. 8 are arranged to apply actuating forces so as to generate a torque or moment between the movable part 10 and the support structure 1 in a first sense (e.g. clockwise) around the primary axis O. The two actuating units 80a of FIG. 7 and the two actuating units of FIG. 8 are arranged to apply actuating forces so as to generate a torque or moment between the movable part 10 and the support structure 1 in a second, opposite sense (e.g. anti-clockwise) around the primary axis O. This allows the movable part 10 to be rotated by simultaneously increasing or decreasing the tension of SMA wires 70.

As shown in FIG. 7, one first SMA wire 70b and one actuating unit 80a may be arranged to apply actuating forces in a corner of the actuator assembly 100. The other first SMA wire 70b and other actuating unit 80a may be arranged to apply actuating forces in another, opposite corner of the actuator assembly 100.

The actuator assembly 100, and in particular the movable part 10 and/or the support structure 1, may have a square or rectangular footprint. Each actuating unit 30 may be provided on one of the four sides of the actuator assembly 2.

The arrangement of forces applied between movable part 10 and support structure 1 corresponds to the forces applied by the arrangement of SMA wires 30 described in WO2013/175197 A1, which is herein incorporated by reference.

Although, for illustrative purposes, the arrangement of SMA wires 70 and actuating units 80 is described as moving the movable part 10 in the movement plane (e.g. translationally along the x and y axis, or rotationally about the primary axis O), in other embodiments the movable part 10 may be moved differently. For example, the same arrangement of actuating forces may be used to tilt the movable part 10 relative to the support structure 1 about axes orthogonal to the primary axis, due to appropriate movement constraints provided by the bearing arrangement 40. For example, the bearing arrangement 40 may comprise a plurality of flexures for guiding tilting of the movable part 10 about the axes orthogonal to the primary axis O. Examples of such bearing arrangement 40 are described in WO2022/029441 A1, which is herein incorporated by reference.

Although the actuator assembly 100 is described herein in the context of four forces (provided by two SMA wires 70b and two actuating units 80a, or two actuating units 80a and two actuating units 80b), in general the actuator assembly 100 may comprise fewer SMA wires 70 and/or actuating units 80 to apply fewer forces. For example, the actuator assembly 100 of FIG. 7 may comprise one first SMA wire 70b and one actuating unit 80a, e.g. those applying forces to the top left corner of the movable part 10 in FIG. 7. Similarly, the actuator assembly 100 of FIG. 8 may comprise one actuator assembly 80b and one actuating unit 80a, e.g. those applying forces to the bottom left corner of the movable part 10 in FIG. 8. The forces applied to the movable part 10 by SMA wires 70 and/or actuating units 80 may be opposed by a biasing force of one or more resilient elements, such as springs.

SMA

The above-described SMA actuator assemblies comprise at least one SMA element. The term 'shape memory alloy (SMA) element' may refer to any element comprising SMA. The SMA element may be described as an SMA wire. The SMA element may have any shape that is suitable for the purposes described herein. The SMA element may be elongate and may have a round cross section or any other shape cross section. The cross section may vary along the length of the SMA element. The SMA element might have a relatively complex shape such as a helical spring. It is also possible that the length of the SMA element (however defined) may be similar to one or more of its other dimensions. The SMA element may be sheet-like, and such a sheet may be planar or non-planar. The SMA element may be pliant or, in other words, flexible. In some examples, when connected in a straight line between two components, the SMA element can apply only a tensile force *which* urges the two components together. In other examples, the SMA element may be bent around a component and can apply a force to the component as the SMA element tends to straighten under tension. The SMA element may be beam-like or rigid and may be able to apply different (e.g. non-tensile) forces to elements. The SMA element may or may not include material(s) and/or component(s) that are not SMA. For example, the SMA element may comprise a core of SMA and a coating of non-SMA material. Unless the context requires otherwise, the term 'SMA element' may refer to any configuration of SMA material acting as a single actuating element *which*, for example, can be individually controlled to produce a force on an element. For example, the SMA element may comprise two or more portions of SMA material that are arranged mechanically in parallel and/or in series. In some arrangements, the SMA element may be part of a larger SMA element. Such a larger SMA element might comprise two or more parts that are individually controllable, thereby forming two or more SMA elements. The SMA element may comprise an SMA wire, SMA foil, SMA film or any other configuration of SMA material. The SMA element may be manufactured using any suitable method, for example by a method involving drawing, rolling, deposition and/or other forming process(es). The SMA element may exhibit any shape memory effect, e.g. a thermal shape memory effect or a magnetic shape memory effect, and may be controlled in any suitable way, e.g. by Joule heating, another heating technique or by applying a magnetic field.

The invention claimed is:

1. An actuator assembly comprising:
   a support structure;
   a movable part that is movable relative to the support structure; and
   a set of at least two actuating units, wherein a first one of the actuating units is configured, on actuation, to apply a force on the movable part that is substantially directed along a line in a first direction in a plane perpendicular to a primary axis, and a second one of the actuating units is configured, on actuation, to apply a force on the movable part that is substantially directed along the line in a second direction, wherein the first direction is opposite the second direction, and wherein each actuating unit comprises:
   a force-modifying mechanism connected to one of the support structure and the movable part;
   a coupling link connected between the force-modifying mechanism and the other of the support structure and the movable part; and
   a shape memory alloy (SMA) element connected between the force-modifying mechanism and the one of the support structure and the movable part, wherein the SMA element is configured to exert an input force on the force-modifying mechanism, thereby causing the force-modifying mechanism to apply an output force on the coupling link and causing the coupling link to apply an actuating force on the other of the support structure and the movable part, wherein the component of the input force along the primary axis has a greater magnitude than the component of the input force in any direction perpendicular to the primary axis.

2. The actuator assembly according to claim 1, wherein, in at least one of the actuating units, the SMA element extends in a direction that I substantially parallel to the primary axis.

3. The actuator assembly according to claim 1, wherein the set of one or more actuating units comprises a plurality of actuating units including a first actuating unit configured to apply a force on the movable part that is substantially directed along a first line, and a second actuating unit configured to apply a force on the movable part that is substantially directed along a second line that is perpendicular to the first line.

4. The actuator assembly according to claim 1, wherein, in at least one of the actuating units, the coupling link comprises a coupling flexure.

5. The actuator assembly according to claim 1 wherein, in at least one of the actuating units, the force modifying mechanism comprises:
  a body portion to which the SMA element and the coupling link are connected; and
  a force-modifying flexure connected between the body portion and the one of the support structure and the movable part, wherein the force-modifying flexure is configured to bend in response to the input force.

6. The actuator assembly according to claim 5, wherein the set of one or more actuating units comprises a set of one or more first actuating units for moving the movable part perpendicularly to the primary axis.

7. The actuator assembly according to claim 6, wherein the set of one or more actuating units comprises four first actuating units spaced around the primary axis and configured to be capable of moving the part in any direction in a movement plane perpendicular to the primary axis.

8. The actuator assembly according to claim 5, wherein, in the at least one of the actuating units, the body portion of the force-modifying mechanism is integrally formed with the force-modifying flexure and/or at least a part of the coupling link.

9. The actuator assembly according to claim 1, wherein the support structure corresponds to an elongate body having a longitudinal axis, and the primary axis corresponds to the longitudinal axis.

10. The actuator assembly according to claim 1, wherein:
  the actuator assembly is part of a folded camera assembly; and
  the movable part comprises at least one of:
    at least one lens having an optical axis that is parallel to, or collinear with, the primary axis, wherein the one or more actuating units are for moving the at least one lens to provide at least one of optical image stabilisation, autofocus, or zoom; or
    an image sensor having a normal that is parallel to the primary axis, wherein the one or more of the actuating units are for moving the image sensor to provide optical image stabilisation and/or super-resolution.

11. An actuator assembly comprising:
  a support structure;
  a movable part that is movable relative to the support structure;
  at least one first shape memory alloy (SMA) element arranged, on actuation, to apply a force on the movable part relative to the support structure along a first axis; and
  at least two actuating units arranged, on actuation, to apply a force on the movable part with a component along a second axis, wherein the first axis and the second axis are orthogonal to each other, and wherein each of the at least two actuating unitsunit comprises:
  a force-modifying mechanism connected to one of the support structure and the movable part;
  a coupling link connected between the force-modifying mechanism and the other of the support structure and the movable part; and
  a second SMA element arranged, on actuation, to exert an input force on the force-modifying mechanism with a component along the first axis, thereby causing the force-modifying mechanism to apply an output force on the coupling link and causing the coupling link to apply an actuating force on the other of the support structure and the movable part with a component along the second axis;
  wherein a first one of the actuating units is configured, on actuation, to apply a force on the movable part that is substantially directed in a first direction; and
  a second one of the actuating units is configured, on actuation, to apply a force on the movable part that is substantially directed in a second direction, wherein the first direction is opposite the second direction.

12. The actuator assembly according to claim 11, wherein the at least one first SMA element and the second SMA element are parallel or at an acute angle to each other, optionally where the acute angle is less than 30 degrees, further optionally less than 10 degrees.

13. The actuator assembly according to claim 11, wherein the at least one actuating unit is configured such that i) the ratio of actuation amount of the second SMA element to the resulting movement of the movable part along the second axis is substantially equal to ii) the ratio of the actuation amount of the first SMA element to the resulting movement of the movable part along the first axis.

14. The actuator assembly according to claim 11, further comprising at least one second actuating unit comprising the at least one first SMA element and a second force-modifying mechanism arranged to amplify an amount of actuation of the at least one first SMA element to a relatively greater amount of movement of the movable part relative to the support structure.

15. The actuator assembly according to claim 11, wherein the at least one first SMA element is connected at one end directly to the movable part via a connection element and at the other end directly to the support structure via a connection element.

16. The actuator assembly according to claim 11, further comprising two first SMA wires, wherein:
  the at least one actuating unit comprises two actuating units, each with a respective second SMA wire;
  the two first SMA wires and two actuating units are arranged to apply a total of four independent actuating forces to the movable part relative to the movable part; and
  none of the forces applied to the movable part are colinear.

17. The actuator assembly according to claim 16, wherein the two first SMA wires are arranged to apply forces to move the movable part relative to the support structure in opposite directions parallel to the first axis, and the two respective second SMA wires are arranged to apply forces to move movable part relative to the support structure in opposite directions parallel to the second axis.

18. The actuator assembly according to claim 11, wherein at least two SMA elements are provided on the same side of the movable part when viewed along a primary axis that is perpendicular to the first and second axes.

19. The actuator assembly according to claim 11, the at least one first SMA element has a longitudinal extent that goes beyond the extend of the movable part when viewed along a primary axis that is perpendicular to the first and second axes.

\* \* \* \* \*